US011449466B2

(12) United States Patent
Corniquet et al.

(10) Patent No.: US 11,449,466 B2
(45) Date of Patent: Sep. 20, 2022

(54) DELETING ORPHAN ARCHIVED FILES FROM STORAGE ARRAY USING A TIME-BASED DECISION ALGORITHM

(71) Applicant: EMC IP Holding Company LLC, Hopkinton, MA (US)

(72) Inventors: Frederic Corniquet, Le Pecq (FR); Anurag Bhatnagar, Bangalore (IN); Priyamrita Ghosh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 16/878,246

(22) Filed: May 19, 2020

(65) Prior Publication Data
US 2021/0365409 A1 Nov. 25, 2021

(51) Int. Cl.
| G06F 17/00 | (2019.01) |
| G06F 7/00 | (2006.01) |
| G06F 16/16 | (2019.01) |
| G06F 16/11 | (2019.01) |
| G06F 16/17 | (2019.01) |
| G06F 16/185 | (2019.01) |
| G06F 16/182 | (2019.01) |

(52) U.S. Cl.
CPC .......... *G06F 16/162* (2019.01); *G06F 16/128* (2019.01); *G06F 16/1734* (2019.01); *G06F 16/185* (2019.01); *G06F 16/1824* (2019.01)

(58) Field of Classification Search
CPC .............. G06F 16/162; G06F 16/1824; G06F 16/1734; G06F 16/128; G06F 16/185

USPC ........................................................ 707/662
See application file for complete search history.

(56) References Cited

U.S. PATENT DOCUMENTS

| 9,503,542 | B1 * | 11/2016 | Wang ...................... H04L 67/06 |
| 9,588,977 | B1 * | 3/2017 | Wang ...................... G06F 16/13 |
| 9,727,470 | B1 * | 8/2017 | Cande ..................... G06F 3/067 |
| 9,959,280 | B1 * | 5/2018 | Whitehead .............. G06F 16/13 |
| 2004/0163029 | A1 * | 8/2004 | Foley .................. G06F 11/1469 714/769 |

(Continued)

OTHER PUBLICATIONS

Dell Inc., Dell EMC Unity: Cloud Tiering Appliance (CTA), available at https://www.dellemc.com/fr-mg/collaterals/unauth/white-papers/solutions/h16376-dell-emc-unity-cloud-tiering-appliance.pdf, Mar. 2019.

*Primary Examiner* — Pavan Mamillapalli
(74) *Attorney, Agent, or Firm* — Ryan, Mason & Lewis, LLP

(57) ABSTRACT

Methods, apparatus, and processor-readable storage media for deleting orphan archived files from a storage array using a time-based decision algorithm are provided herein. An example computer-implemented method includes traversing a database of a local storage system to identify a record associated with a stub file, wherein the record is indicative of a time of a client operation, involving the stub file, on a file system of the local storage system; identifying a particular snapshot in a set of available snapshots of the file system; and providing an indication to a cloud storage platform to delete a cloud object corresponding to the stub file in response to determining that the time of the client operation occurred earlier than a snapshot time associated with the particular snapshot in the set.

20 Claims, 10 Drawing Sheets

(56) References Cited

U.S. PATENT DOCUMENTS

| | | | |
|---|---|---|---|
| 2010/0333116 A1* | 12/2010 | Prahlad | G06F 3/067 |
| | | | 713/153 |
| 2014/0172783 A1* | 6/2014 | Suzuki | G06F 8/63 |
| | | | 707/754 |
| 2014/0250300 A1* | 9/2014 | Runkis | H04L 9/0894 |
| | | | 713/165 |
| 2015/0154211 A1* | 6/2015 | Matsubara | H04L 67/01 |
| | | | 707/812 |
| 2015/0293896 A1* | 10/2015 | Runkis | G06F 3/0623 |
| | | | 707/755 |
| 2016/0246545 A1* | 8/2016 | Yokoi | G06F 3/061 |
| 2017/0075907 A1* | 3/2017 | Goswami | G06F 11/0751 |
| 2019/0227878 A1* | 7/2019 | Agarwal | G06F 11/1464 |

* cited by examiner

US 11,449,466 B2

DELETING ORPHAN ARCHIVED FILES FROM STORAGE ARRAY USING A TIME-BASED DECISION ALGORITHM

FIELD

The field relates generally to information processing systems, and more particularly to storage in such systems.

BACKGROUND

Data storage systems, such as those utilized in network-attached storage (NAS) platforms, allow large sets of data to be maintained in an efficient and reliable way. Data stored in such storage systems can be transferred to cloud object storage based on a user-defined policy using, for example, virtualization software running on the data storage system.

A need exists for improved cloud object management techniques.

SUMMARY

Illustrative embodiments of the disclosure provide techniques for managing orphan archived files in a storage array. An exemplary computer-implemented method includes traversing a database of a local storage system to identify a record associated with a stub file, wherein the record is indicative of a time of a client operation, involving the stub file, on a file system of the local storage system; identifying a particular snapshot in a set of available snapshots of the file system; and providing an indication to a cloud storage platform to delete a cloud object corresponding to the stub file in response to determining that the time of the client operation occurred earlier than a snapshot time associated with the particular snapshot in the set.

Illustrative embodiments can provide significant advantages relative to conventional storage management techniques. For example, challenges associated with orphan archived files are overcome in one or more embodiments through deleting such orphan archived files based on a time-based decision algorithm.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Typically, when a local storage system transfers a file to cloud object storage, a local stub file (having an approximate size of 8 kilobytes, for example) is created on the local data storage system along with an additional link entry in a file system stub database, which acts as a pointer to a cloud address where data corresponding to the file is stored. The virtualization software allows the local data storage system to access the data sent to the cloud object storage and to rehydrate these files back to the local data storage system using a copy mechanism. The term "rehydrate" as used herein generally refers to any operation which reverses the process that is performed when transferring a file to cloud object storage, such as, for example, an operation which reconstitutes a file on the local storage system based on corresponding data in cloud object storage.

Rehydrating or deleting a stub file can lead to orphan cloud objects. The term "orphan cloud object" as used herein is intended to be broadly construed, and generally refers to a cloud object allocated to an address space without a pointer pointing to it. If these orphan cloud objects are deleted and the local data storage system is restored (e.g., based on a file system snapshot), then data loss can occur.

Figure 1:
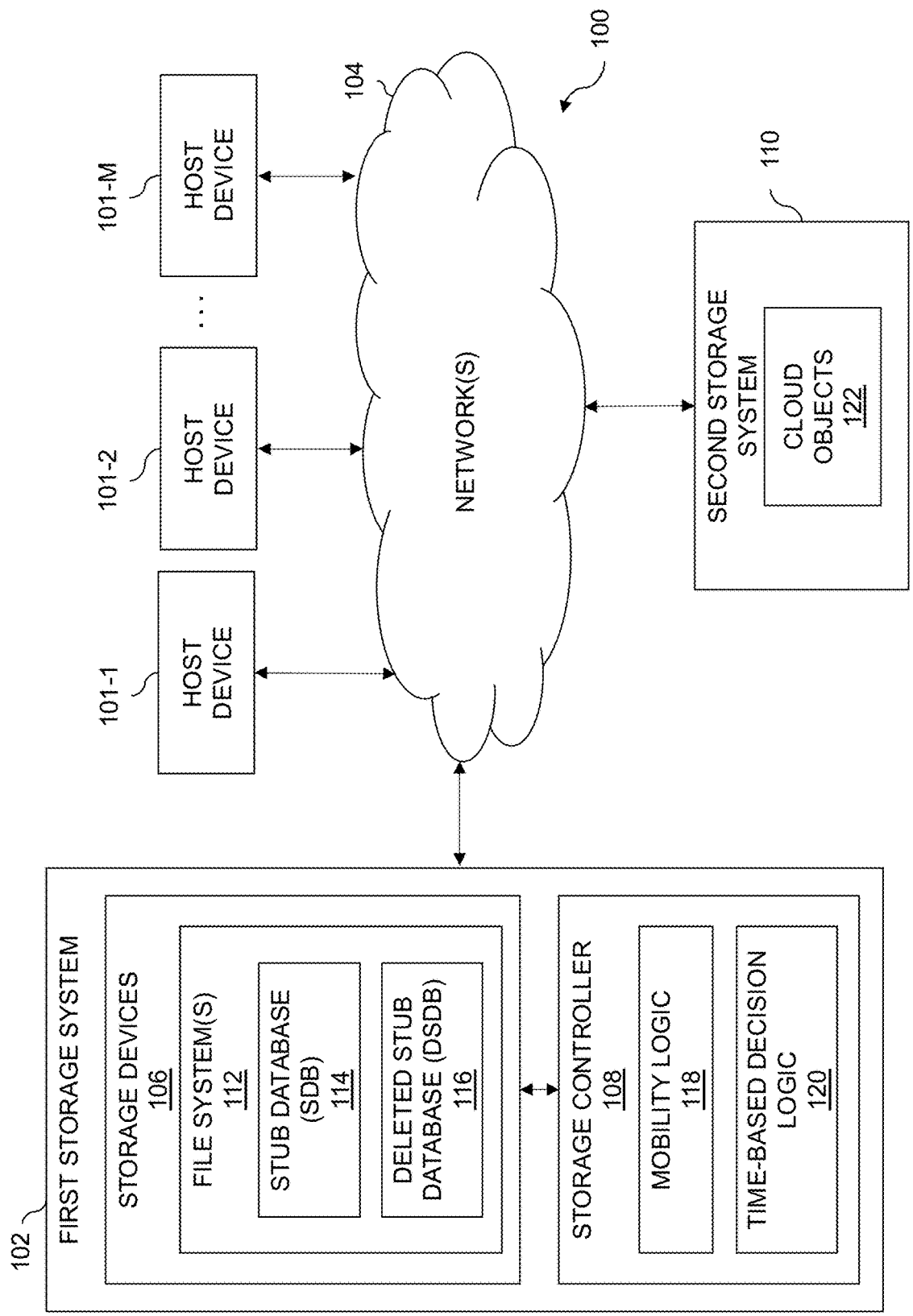
FIG. 1 shows an information processing system configured for deleting orphan archived files from a storage array in an illustrative embodiment.

FIG. 1 shows an information processing system 100 configured in accordance with an illustrative embodiment. The information processing system 100 comprises a plurality of host devices 101-1, 101-2, . . . 101-M, collectively referred to herein as host devices 101, and a first storage system 102. The host devices 101 are configured to communicate with the first storage system 102 over a network 104. Also, shown in FIG. 1 is a second storage system 110, which in at least some embodiments corresponds to a cloud storage system that, optionally, stores cloud objects 122.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the first storage system 102.

The term "input-output" as used herein refers to at least one of input and output. For example, IO operations may comprise write requests and/or read requests directed to logical addresses of a particular logical storage volume of the first storage system 102. These and other types of IO operations are also generally referred to herein as IO requests.

The first storage system 102 illustratively comprises processing devices of one or more processing platforms. For example, the first storage system 102 can comprise one or more processing devices each having a processor and a memory, possibly implementing virtual machines and/or containers, although numerous other configurations are possible.

The first storage system 102 can additionally or alternatively be part of a cloud infrastructure such as an Amazon Web Services (AWS) system. Other examples of cloud-based systems that can be used to provide at least portions of the first storage system 102 include Google Cloud Platform (GCP) and Microsoft Azure.

The host devices 101 and the first storage system 102 may be implemented on a common processing platform, or on separate processing platforms. The host devices 101 are illustratively configured to write data to and read data from the first storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage system 102 comprises a plurality of storage devices 106 and an associated storage controller 108. The storage devices 106 store data of a plurality of storage volumes. For example, the storage volumes may illustratively comprise respective logical units (LUNs) or other types of logical storage volumes. The term "storage volume" as used herein is intended to be broadly construed, and should not be viewed as being limited to any particular format or configuration.

The storage devices 106 of the first storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the first storage system 102.

It is therefore to be appreciated that numerous different types of storage devices 106 can be used in first storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In the FIG. 1 embodiment, the first storage system 102 includes at least one file system 112. In some exemplary embodiments, one or more of the host devices 101 may also include at least one file system. The term "file system" as used herein is intended to be broadly construed, and is not intended to be limited to any particular device or configuration. As depicted in FIG. 1, the at least one file system 112 may include a stub database (SDB) 114 and a deleted stub database (DSDB) 116. According to exemplary embodiments, the stub database 114 and the DSDB 116 are maintained to enable integration of the file system 112 with the second storage system 110. In such embodiments, this allows the file system 112 to be cloud-enabled, as described in more detail herein. In at least one example embodiment, the SDB 114 and the DSDB 116 may be implemented as hidden directories, within the file system 112.

The SDB 114 includes data pertaining to hard links of stubbed files of the file system 102. Generally, once a file has been sent from the first storage system 102 to the second storage system 110, a stub file is created in the SDB 114 that acts as a pointer to a cloud address of one of the cloud objects 122 that stores the data of the file. The DSDB 116 is used for holding hard links of deleted stubbed files or rehydrated stubbed files. The SDB 114 and the DSDB 116 may be maintained at least in part by mobility logic 118 and time-based decision logic 120 of storage controller 108 as described in more detail elsewhere herein.

In some embodiments, the first storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the first storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the first storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the first storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the first storage system 102. Such interaction illustratively includes generating IO operations, such as write and read requests, and sending such requests over the network 104 for processing by the first storage system 102. In some embodiments, each of the host devices 101 comprises a multi-path input-output (MPIO) driver configured to control delivery of IO operations from the host device to the first storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the first storage system 102.

The MPIO driver may comprise, for example, an otherwise conventional MPIO driver, such as a PowerPath® driver from Dell EMC. Other types of MPIO drivers from other driver vendors may be used.

The storage controller 108 of first storage system 102 in the FIG. 1 embodiment includes mobility logic 118 and time-based decision logic 120. Functionality for deleting orphan archived files from a storage array using a time-based decision algorithm in the first storage system 102 is illustratively performed at least in part by the storage controller 108, utilizing its mobility logic 118 and/or its time-based decision logic 120, in a manner to be described in more detail elsewhere herein.

The storage controller 108 and the first storage system 102 may further include one or more additional modules and other components typically found in conventional implementations of storage controllers and storage systems, although such additional modules and other components are omitted from the figure for clarity and simplicity of illustration.

The first storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the first storage system 102 in such an embodiment collectively comprise at least a portion of the storage controller 108 of the first storage system 102. For example, in some embodiments the sets of processing modules of the storage nodes collectively comprise a distributed storage controller of the distributed first storage system 102. A "distributed storage system" as that term is broadly used herein is intended to encompass any storage system that, like the first storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of first storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The first storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the first storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the first storage system 102 to reside in different data centers. Numerous other distributed implementations of the host devices and the first storage system 102 are possible.

In some example embodiments, the second storage system 110 may correspond to a cloud storage system and may be implemented in a similar manner as the first storage system 102. For example, in at least one example embodiment, the first storage system 102 may relate to a local storage system (such as, for example, a NAS storage system), and the second storage system 110 may relate to one or more cloud storage systems (such as, for example, storage systems corresponding to Elastic Cloud Storage (ECS), GCP, AWS, and Microsoft Azure).

Additional examples of processing platforms utilized to implement host devices 101, first storage system 102, and second storage system 110 in illustrative embodiments will be described in more detail below in conjunction with FIGS. 8 and 9.

It is to be appreciated that these and other features of illustrative embodiments are presented by way of example only, and should not be construed as limiting in any way.

Accordingly, different numbers, types and arrangements of system components such as host devices 101, first storage system 102, network 104, storage devices 106, storage controller 108, second storage system 110, mobility logic 118, and time-based decision logic 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing application mobility logic 118 and time-based decision logic 120 will be described in more detail with reference to the flow diagram of FIG. 7.

As noted above, files on a local storage array (e.g., first storage system 102) are transferred to cloud object storage (e.g., second storage system 110) based on one or more user defined policies via virtualization software running on a storage array platform. The virtualization software (also referred to herein as "mobility software") may be implemented at least in part by mobility logic 118. The mobility software includes functionality to allow the local storage array to access these cloud files and to rehydrate any of these files back to the local storage array platform's file storage through a copy mechanism. When a file is sent to cloud object storage, a local stub file is created on the local storage array, which acts as a pointer to a cloud address.

Additionally, the local storage array may be configured to capture snapshots of the file system, for example, on a periodic basis or in response to an event such as, for example, a user request. As such, the file system may be associated with a plurality of different snapshots, wherein each of the snapshots is associated with a time the snapshot was created. The file system may be restored to the creation time corresponding to one of these snapshots by performing a snapshot restore operation.

According to one or more exemplary embodiments, the mobility software allows clients to rehydrate and/or delete a stub file without deleting the corresponding cloud objects. When such client operations are performed (e.g., rehydrate and/or delete operations), the stub file is initially moved from a user space of the file system to a DSDB. The mobility software may perform an orphan management job on the file system at some later time (e.g., such as on a periodic basis). The orphan management job may include traversing the DSDB and checking if there are any records in the DSDB. In one or more example embodiments, if there are records in the DSDB, then the mobility software checks if a stub time of each of the DSDB records is greater than the creation time of the latest available snapshot that exists in the file system. This ensures that the software does not delete a cloud object from the cloud object storage until a time a snapshot exists in the file system (as the object may be restored by the user at any point of time). This time-based comparison can drastically reduce the time taken to lookup a large number (e.g., millions) of DSDB records across all available snapshots in the file system.

Figure 2A:
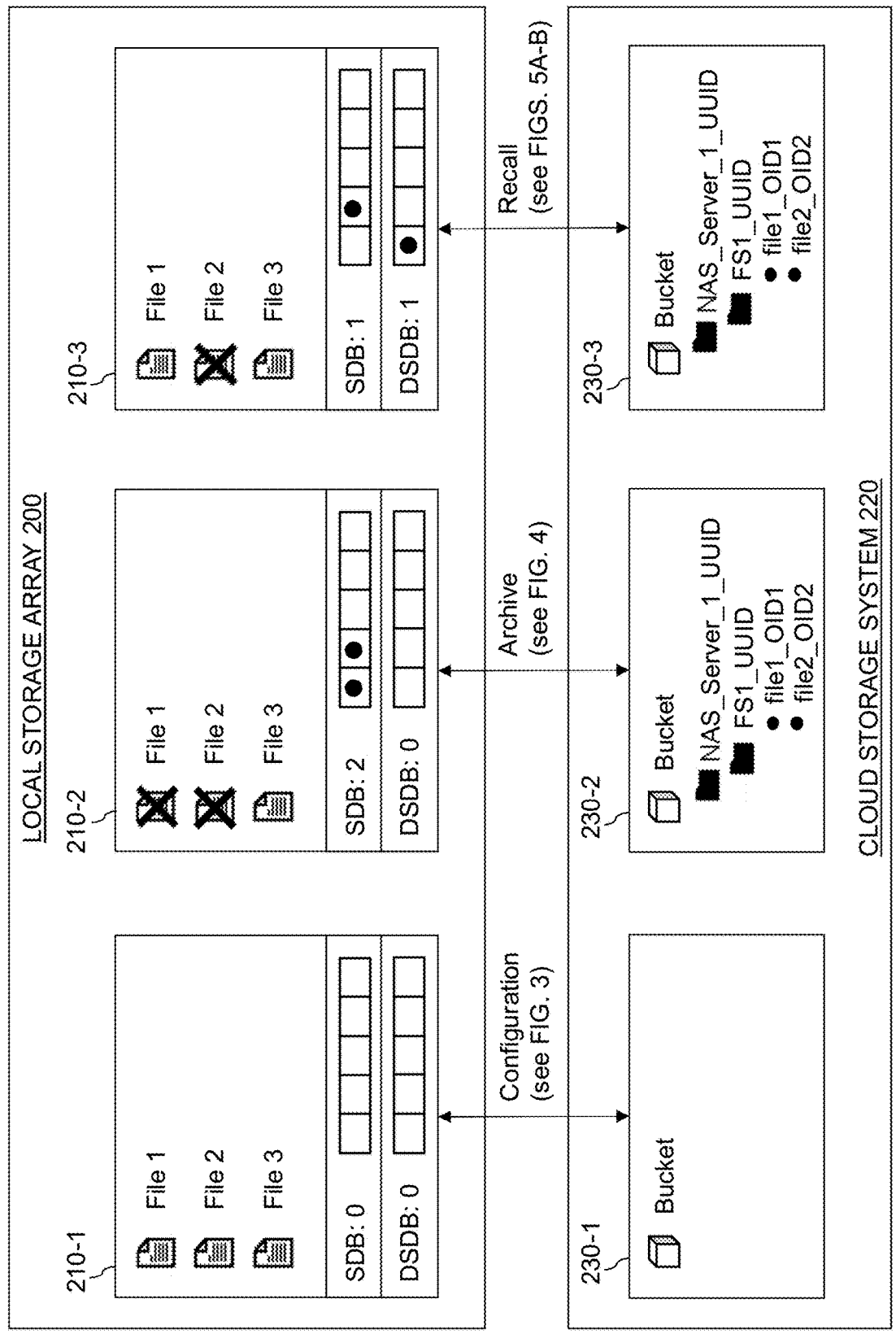
FIGS. 2A and 2B show examples of operations between a local storage array and a cloud storage system in an illustrative embodiment.
Figure 2B:
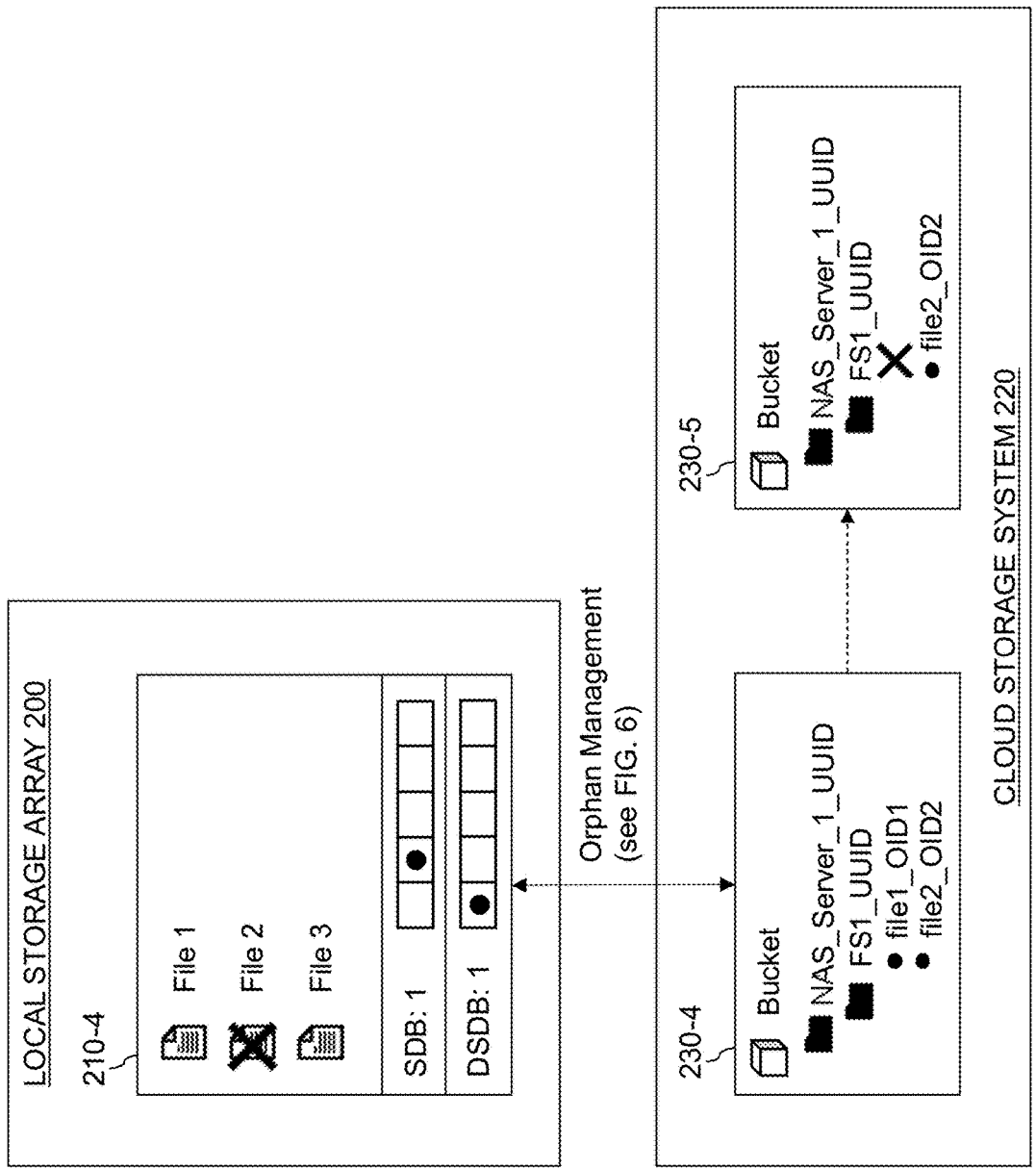

FIGS. 2A and 2B show an example of operations between a local storage array and a cloud storage system in an illustrative embodiment. FIGS. 2A and 2B depict various states (or snapshots) 210-1 to 210-4 of a file system of a local storage array 200 at different times. Additionally, FIGS. 2A and 2B show corresponding states of a bucket 230-1 to 230-5 of a cloud storage system 220. By way of example, the local storage array may correspond to the first storage system 102 and the cloud storage system 220 may correspond to the second storage system 110 of FIG. 1.

Initially, a configuration process is performed between the local storage array 200 and the cloud storage system 220, as discussed further below in conjunction with FIG. 3. In this example, the configuration process is performed when the file system is in state 210-1. An archive process is performed between the local storage array 200 and the cloud storage system 220, as discussed further below in conjunction with FIG. 4. In this example, the archive process is performed when the file system is in state 210-2. A recall process is performed between the local storage array 200 and the cloud storage system 220, as discussed further below in conjunction with FIG. 5. In this example, the recall process is performed when the file system is in state 210-3. As shown in FIG. 2B, an orphan management process is performed between the local storage array 200 and the cloud storage system 220, as discussed further below in conjunction with FIG. 6. In this example, the orphan management process is performed when the file system is in state 210-4.

Figure 3:
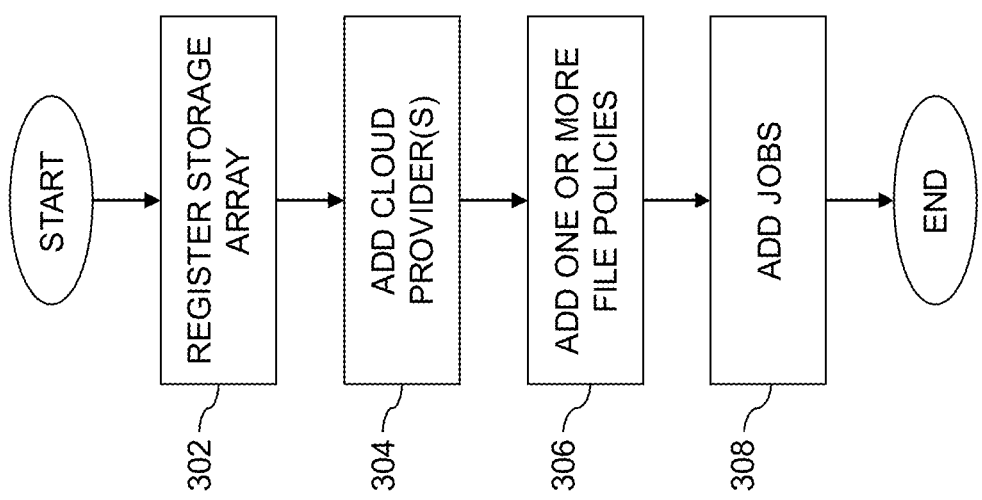
FIG. 3 shows a logic flow diagram for a configuration process in an illustrative embodiment.

FIG. 3 shows a logic flow diagram for such a configuration process in an illustrative embodiment. Step 302 of the configuration process includes registering a local storage array. Step 304 includes adding one or more cloud providers. Step 306 includes adding one or more file policies, and step 308 includes adding one or more jobs to be performed. The one or more cloud providers may, for example, include ECS, GCP, AWS, and Microsoft Azure. The file policies may include rules for archiving files, such as, for example, a rule to archive all files having a size greater than 8 kilobytes to a first one of the cloud providers and/or a rule to archive files having a modification time greater than 3 months to a second one of the cloud providers. A non-limiting example of a job corresponding to step 308 includes archiving files based on the file policies at one or more times (e.g., perform a job every Saturday at 11:00 PM based on a first policy, perform a job on the $20^{th}$ of each month based on a second policy, etc.).

Referring again to FIG. 2A, prior to the configuration, the state 210-1 of the file system includes three files (File 1, File 2, and File 3). The configuration process results in state 230-1 of the cloud storage system 220. The bucket depicted at state 230-1 is empty as no file has been archived to the cloud storage system 220.

Figure 4:
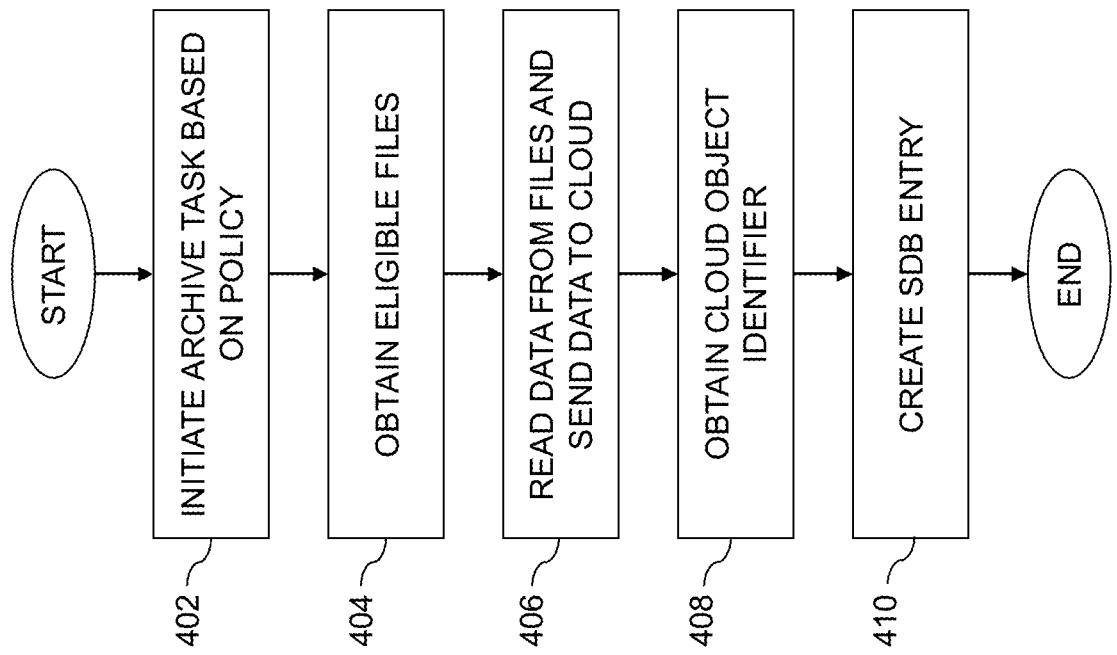
FIG. 4 shows a logic flow diagram for an archive process in an illustrative embodiment.

An archive operation is then performed between the local storage array 200 and the cloud storage system 220 which results in state 210-2 of the file system and state 230-2 of the cloud storage system 220. FIG. 4 depicts an example of such an archive process in an illustrative embodiment. In the FIG. 4 embodiment, step 402 includes initiating an archive task based on, for example, the policies defined in the configuration process. Step 404 includes obtaining the eligible files, and step 406 includes reading the data from the eligible files and sending the data to the cloud storage system (e.g., over HTTP). The eligible files may be read, for example, using a CIFS (Common Internet File System) and/or an NFS (Network File System). Step 408 includes obtaining a cloud object identifier (OID) for each of the eligible files. Step 410 includes creating a record for each of the files in an SDB. In some example embodiments, step 410 may also include setting the path of the eligible files on the local storage array as being offline.

In FIG. 2A, it is assumed that the eligible files are File 1 and File 2, and the archive operation causes the data corresponding to these files to be stored in the cloud storage system 220 as "file1_OID1" and "file2_OID2". In this regard, File 1 and File 2 are crossed out at state 210-2 to represent the respective paths being set offline, and two hard links for the files are added to the SDB for each of these files as represented by the two dots in the SDB of state 230-2. Each record in the SDB may include, for example, the relevant OID and a timestamp corresponding to when the record was created.

Figure 5:
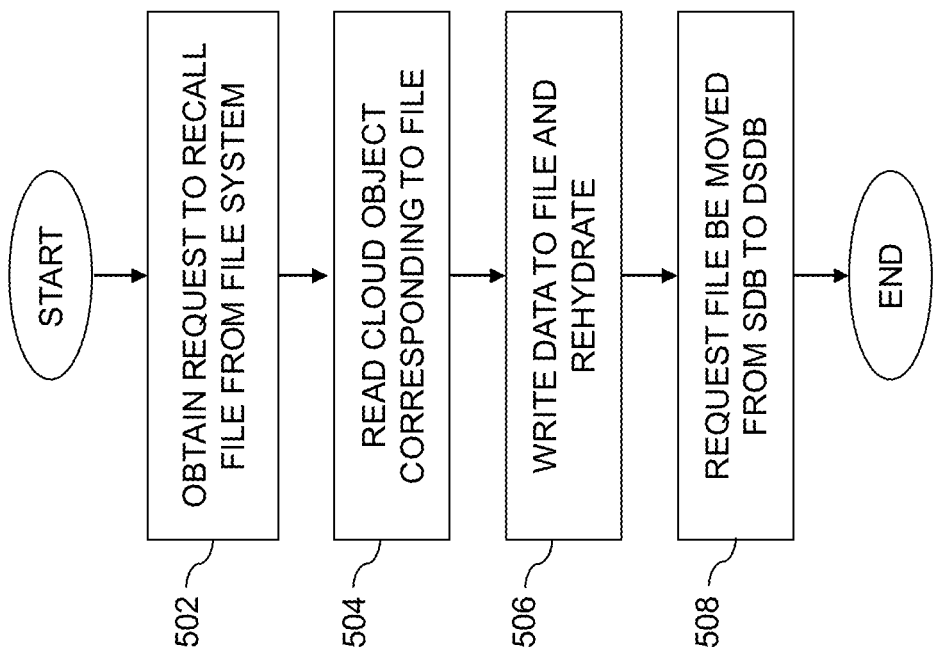
FIG. 5 shows a logic flow diagram for a recall process in an illustrative embodiment.

FIG. 2A also shows a recall operation that results in state 210-3 of the file system and state 230-3 of the cloud storage system 220. FIG. 5 shows an example of a recall process in accordance with an exemplary embodiment. Step 502 includes obtaining a request to recall a file from a file system. Step 504 includes reading data corresponding to the file from a cloud object. Step 506 includes writing data from the cloud object to the file to rehydrate it. Step 508 includes moving the record in the SDB to the DSDB.

By way of example, consider a request to recall File 1 from the cloud storage system 220 in FIG. 2A. The result of this recall operation is rehydrating File 1 using the cloud object identified by "file1_OID1", and moving the entry corresponding to File 1 from the SDB to the DSDB, as depicted by state 210-3 in FIG. 2A. It is noted that the state of the cloud storage system does not change (namely, state 230-2 and state 230-3 are the same). As such, the cloud object corresponding to "file1_OID1" in the cloud storage system 220 may potentially become an orphan cloud object as there is no pointer in the SDB that points to this cloud object.

Now assume an orphan management task is initiated on the file system of the local storage array 200. Conventionally, performing such an orphan management task would delete the cloud object corresponding to "file1_OID1" based on the fact that there is no pointer that points to this cloud object. However, this can cause issues if, for example, the file system is restored to an earlier snapshot that includes the pointer to this object (e.g., restoring the file system to state 210-2 after deleting the "file1_OID1" object).

Figure 6:
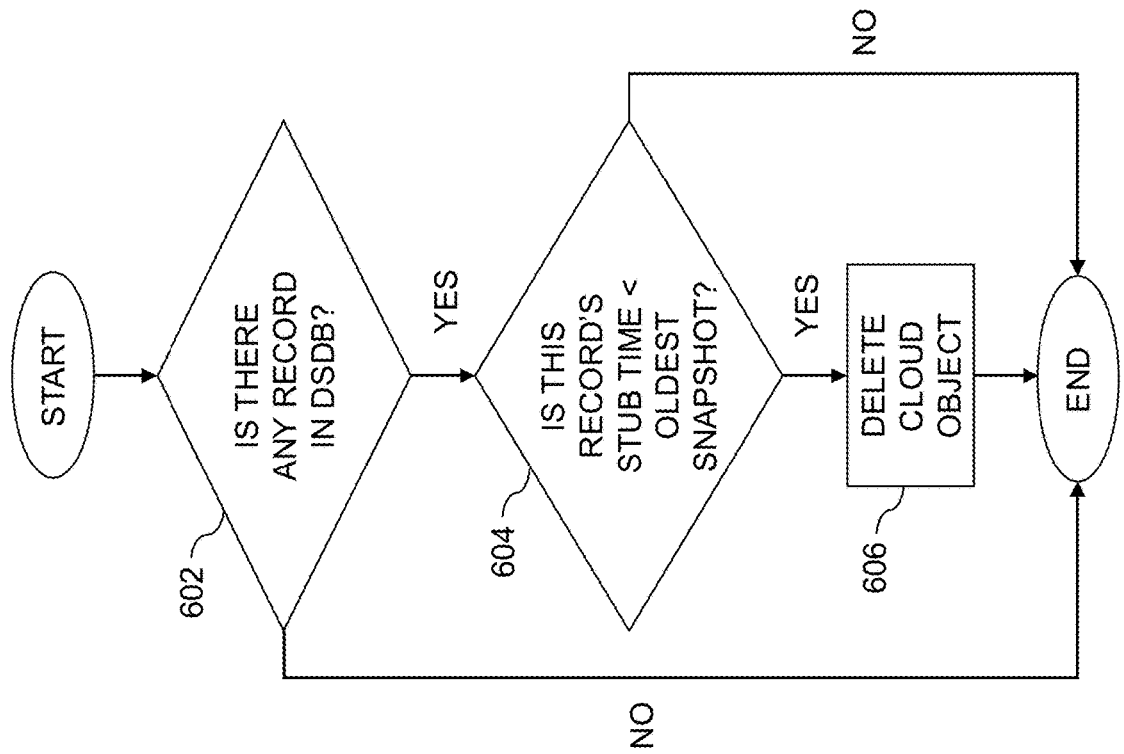
FIG. 6 shows a logic flow diagram for an orphan management process in an illustrative embodiment.

FIG. 6 shows an orphan management process in an illustrative embodiment. Step 602 includes performing a test to determine whether any record exists in the DSDB. If no records exist in the DSDB, then the process ends as there are no orphan cloud objects. If there is at least one record in the DSDB, then the process proceeds to step 604. For each given record in the DSDB, step 604 performs a test to determine whether the timestamp of the given record is less than a timestamp of the oldest snapshot for the file system. In other words, the test at 604 checks whether the record in the DSDB was created at some point in time earlier than the oldest existing snapshot. If the result of step 604 is yes, then process flow continues to step 606, which includes causing (e.g., by sending a request) the corresponding cloud object to be deleted from the cloud storage. If the result of step 604 is no, then the orphan management process ends, thus maintaining the cloud object in the cloud storage system. It is noted that the process shown in FIG. 6 may be repeated for each record in the DSDB.

In the example shown in FIG. 2B, the orphan management process determines that a record corresponding to the "file1_OID1" cloud object exists in the DSDB at state 210-4, and that this record was created at time corresponding to state 210-2 in FIG. 2A. Thus, if the oldest snapshot of the file system of local storage array 200 corresponds to a time before state 210-2, then the object is maintained in the cloud storage system 220, as depicted by state 230-4. Otherwise, the object is deleted from the cloud storage system 220, as depicted by state 230-5.

It is to be appreciated that the example shown in FIGS. 2A-2B is not intended to be limiting and other configurations and options are also possible, such as, for example, having multiple different cloud storage systems and/or multiple different file systems residing on the local storage array.

Additionally, it is to be appreciated that each of the logic flow diagrams in FIGS. 3-6 may be viewed as an algorithm which may be executed, at least in part, by or under the control of at least one processing system and/or storage system. For example, the respective processes shown in FIGS. 3-6 may be implemented as a portion of a software implementation of at least part of storage controller 108 of the FIG. 1 embodiment.

Figure 7:
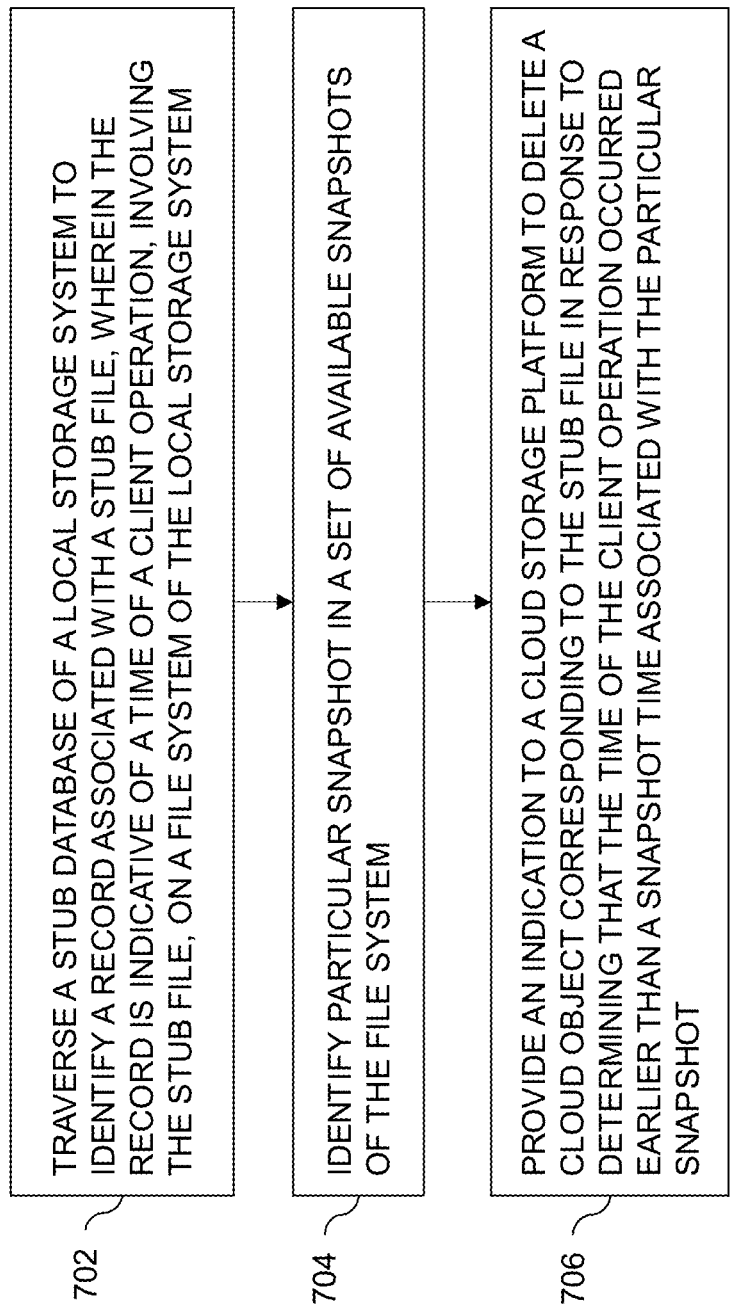
FIG. 7 shows an example of a process for deleting orphan archived files from a storage array using a time-based decision algorithm in illustrative embodiments.

FIG. 7 shows an example of a process for deleting orphan archived files from a storage array using a time-based decision algorithm in illustrative embodiments. It is to be understood that this particular process is only an example, and additional or alternative processes can be carried out in other embodiments.

In this embodiment, the process includes steps 702 through 706. These steps are assumed to be performed by the first storage system 102 utilizing its elements 118 and 120.

Step 702 includes traversing a database of a local storage system to identify a record associated with a stub file, wherein the record is indicative of a time of a client operation, involving the stub file, on a file system of the local storage system. Step 704 includes identifying a particular snapshot in a set of available snapshots of the file system. Step 706 includes providing an indication to a cloud storage platform to delete a cloud object corresponding to the stub file in response to determining that the time of the client operation occurred earlier than a snapshot time associated with the particular snapshot in the set.

The stub file may include a pointer to a location of the cloud object within the cloud storage platform. The cloud object may include a file from the file system that was previously sent from the local storage system to the cloud storage platform. The client operation may include at least one of: a request to delete the stub file from the local storage array; and a request to rehydrate the stub file using data from the cloud object. The process depicted in FIG. 7 may further include a step of generating the record associated with the stub file in response to the client operation by moving the stub file from a user space of the local storage system to the database. Traversing the database of the local storage system may be performed periodically. The process depicted in FIG. 7 may further include a step of, in response to determining that the time of the client operation occurred later than the snapshot time associated with the particular snapshot in the set, preventing the at least one cloud object from being deleted from the cloud storage platform. Providing the indication to the cloud storage platform may include deleting the record in the database. The process depicted in FIG. 7 may further include a step of maintaining the record in the database in response to determining that the time of the client operation occurred later than a snapshot time associated with the particular snapshot in the set, thereby ensuring the cloud object is not deleted. The particular snapshot may correspond to the oldest snapshot in the set.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to account for the time that an oldest snapshot of a file system was created relative to the time a stub file was deleted and/or rehydrated relative in determining whether to delete a corresponding cloud object. These and other embodiments can effectively improve the efficiency of cloud enabled file systems by intelligently managing orphan archived files.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for deleting orphan archived files in a storage system will now be described in greater detail with reference to FIGS. 8 and 9. Although described in the context of system 100, these platforms may also be used to implement at least portions of other information processing systems in other embodiments.

Figure 8:
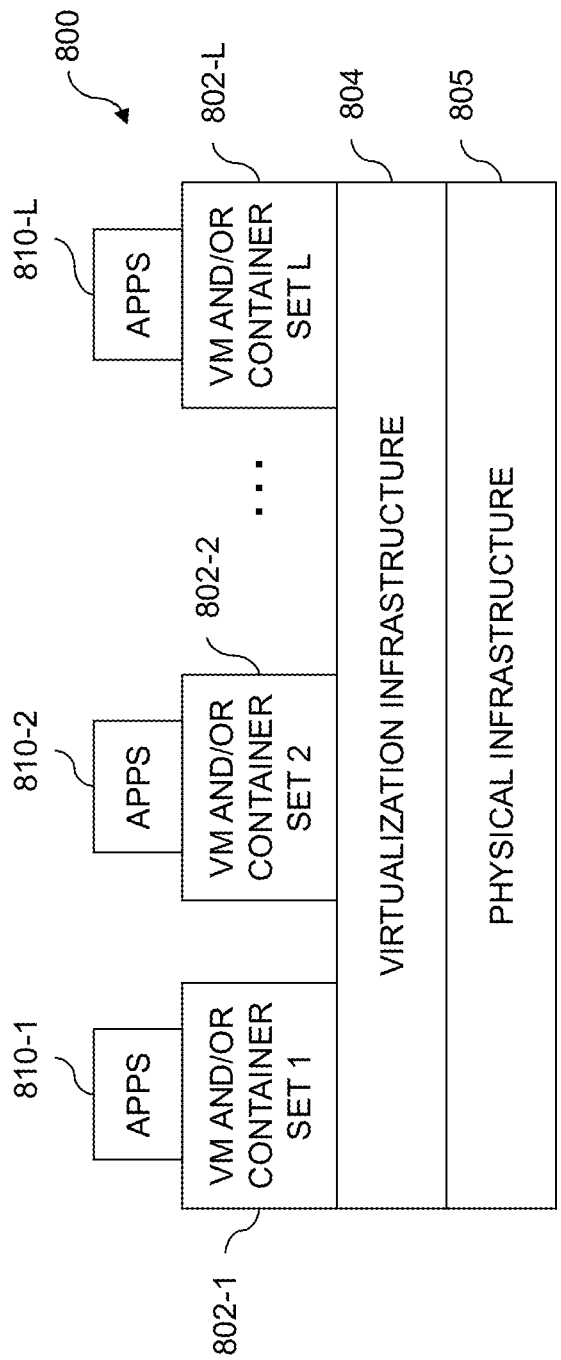
FIGS. 8 and 9 show examples of processing platforms that may be utilized to implement at least a portion of an information processing system in illustrative embodiments.
Figure 9:
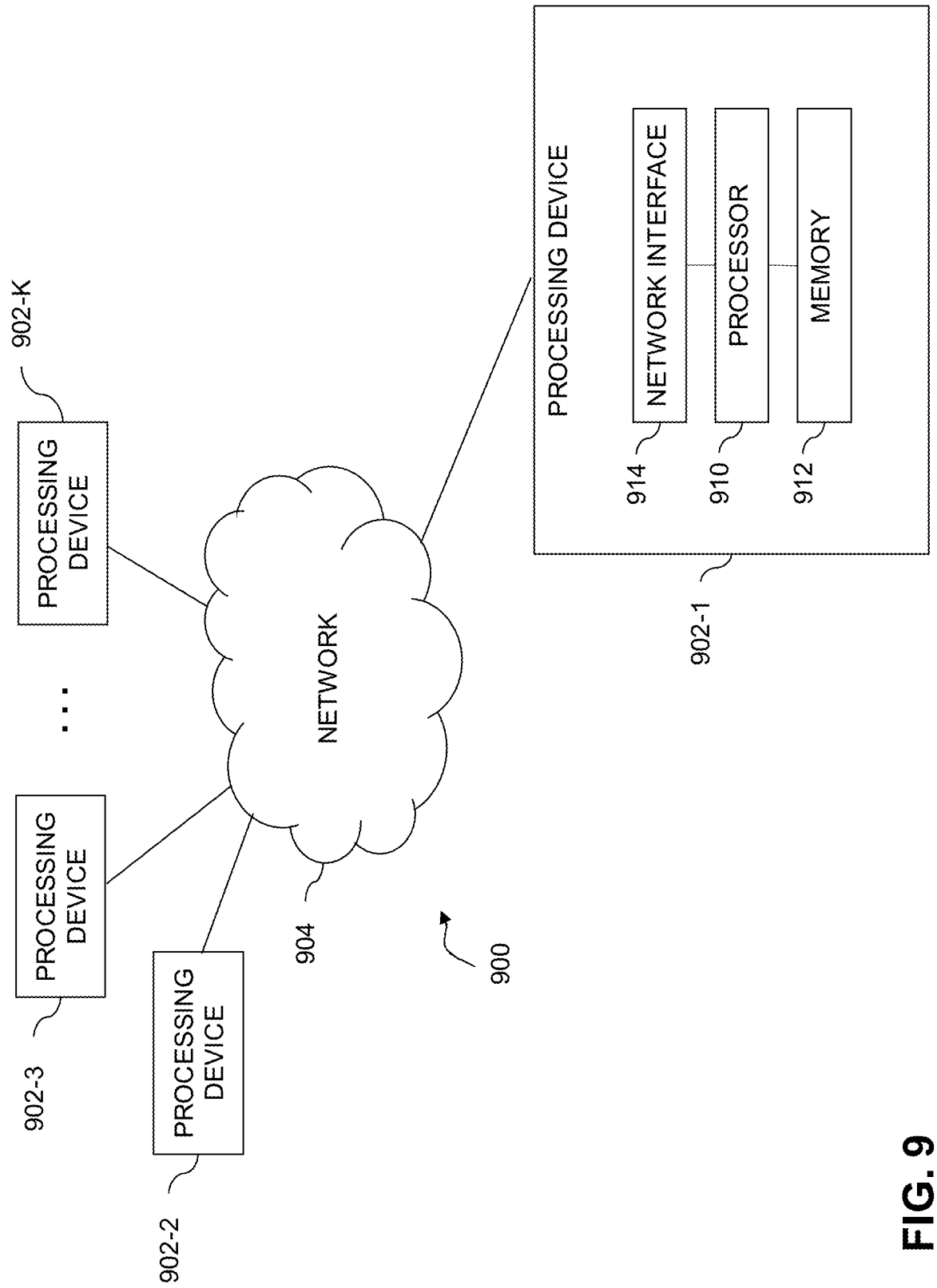

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide functionality for deleting orphan archived files of the type described above using one or more processes running on a given one of the VMs. For example, each of the VMs can implement mobility logic 118, time-based decision logic 120 and/or other components for implementing functionality for deleting orphan archived files in the first storage system 102.

A hypervisor platform may be used to implement a hypervisor within the virtualization infrastructure 804. Such a hypervisor platform may comprise an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can also provide functionality for deleting orphan archived files in a storage system of the type described above. For example, a container host device supporting multiple containers of one or more container sets can implement one or more instances of the mobility logic 118, time-based decision logic 120, and/or other components for implementing functionality for deleting orphan archived files in the first storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for deleting orphan archived files of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
traversing a database of a local storage system to identify a record associated with a stub file, wherein the record is indicative of a time of a client operation, involving the stub file, on a file system of the local storage system;
identifying a particular snapshot in a set of available snapshots of the file system of the local storage system, wherein the particular snapshot comprises the oldest snapshot in the set; and
providing an indication to a cloud storage platform to delete a cloud object corresponding to the stub file in response to determining that the time of the client operation occurred earlier than a snapshot time associated with the particular snapshot in the set, wherein the cloud object comprises a file from the file system that was previously sent from the local storage system to the cloud storage platform;
wherein the method is performed by at least one processing device comprising a processor coupled to a memory.

2. The computer-implemented method of claim 1, wherein the stub file comprises a pointer to a location of the cloud object within the cloud storage platform.

3. The computer-implemented method of claim 1, wherein the client operation comprises at least one of:
a request to delete the stub file from the local storage system; and
a request to rehydrate the stub file using data from the cloud object.

4. The computer-implemented method of claim 1, further comprising:
  generating the record associated with the stub file in response to the client operation by moving the stub file from a user space of the local storage system to the database.

5. The computer-implemented method of claim 1, wherein the traversing the database of the local storage system is performed periodically.

6. The computer-implemented method of claim 1, further comprising:
  in response to determining that the time of the client operation occurred later than the snapshot time associated with the particular snapshot in the set, preventing the cloud object from being deleted from the cloud storage platform.

7. The computer-implemented method of claim 1, wherein the providing the indication to the cloud storage platform further comprises deleting the record in the database.

8. The computer-implemented method of claim 1, further comprising:
  maintaining the record in the database in response to determining that the time of the client operation occurred later than a snapshot time associated with the particular snapshot in the set.

9. A non-transitory processor-readable storage medium having stored therein program code of one or more software programs, wherein the program code when executed by at least one processing device causes the at least one processing device:
  to traverse a database of a local storage system to identify a record associated with a stub file, wherein the record is indicative of a time of a client operation, involving the stub file, on a file system of the local storage system;
  to identify a particular snapshot in a set of available snapshots of the file system of the local storage system, wherein the particular snapshot comprises the oldest snapshot in the set; and
  to provide an indication to a cloud storage platform to delete a cloud object corresponding to the stub file in response to determining that the time of the client operation occurred earlier than a snapshot time associated with the particular snapshot in the set, wherein the cloud object comprises a file from the file system that was previously sent from the local storage system to the cloud storage platform.

10. The non-transitory processor-readable storage medium of claim 9, wherein the stub file comprises a pointer to a location of the cloud object within the cloud storage platform.

11. The non-transitory processor-readable storage medium of claim 9, wherein the client operation comprises at least one of:
  a request to delete the stub file from the local storage system; and
  a request to rehydrate the stub file using data from the cloud object.

12. The non-transitory processor-readable storage medium of claim 9, wherein the at least one processing device is further caused:
  to generate the record associated with the stub file in response to the client operation by moving the stub file from a user space of the local storage system to the database.

13. The non-transitory processor-readable storage medium of claim 9, wherein the traversing the database of the local storage system is performed periodically.

14. The non-transitory processor-readable storage medium of claim 9, wherein the at least one processing device is further caused:
  in response to determining that the time of the client operation occurred later than the snapshot time associated with the particular snapshot in the set, prevent the cloud object from being deleted from the cloud storage platform.

15. The non-transitory processor-readable storage medium of claim 9, wherein the providing the indication to the cloud storage platform further comprises deleting the record in the database.

16. The non-transitory processor-readable storage medium of claim 9, wherein the at least one processing device is further caused:
  to maintain the record in the database in response to determining that the time of the client operation occurred later than a snapshot time associated with the particular snapshot in the set.

17. An apparatus comprising:
  at least one processing device comprising a processor coupled to a memory;
  the at least one processing device being configured:
    to traverse a database of a local storage system to identify a record associated with a stub file, wherein the record is indicative of a time of a client operation, involving the stub file, on a file system of the local storage system;
    to identify a particular snapshot in a set of available snapshots of the file system of the local storage system, wherein the particular snapshot comprises the oldest snapshot in the set; and
    to provide an indication to a cloud storage platform to delete a cloud object corresponding to the stub file in response to determining that the time of the client operation occurred earlier than a snapshot time associated with the particular snapshot in the set, wherein the cloud object comprises a file from the file system that was previously sent from the local storage system to the cloud storage platform.

18. The apparatus of claim 17, wherein the stub file comprises a pointer to a location of the cloud object within the cloud storage platform.

19. The apparatus of claim 17, wherein the client operation comprises at least one of:
  a request to delete the stub file from the local storage system; and
  a request to rehydrate the stub file using data from the cloud object.

20. The apparatus of claim 17, wherein the at least one processing device is further configured:
  to generate the record associated with the stub file in response to the client operation by moving the stub file from a user space of the local storage system to the database.

\* \* \* \* \*